Sept. 7, 1926.

O. F. LUNDELIUS 1,598,867

AIR COOLING SYSTEM FOR ENGINES

Filed Dec. 3, 1923

Inventor.
Oscar Frederick Lundelius
by
*[signature]*
his Attorney.

Patented Sept. 7, 1926.

1,598,867

UNITED STATES PATENT OFFICE.

OSCAR FREDERICK LUNDELIUS, OF LOS ANGELES, CALIFORNIA, ASSIGNOR, BY DIRECT AND MESNE ASSIGNMENTS, TO LUNDELIUS & ECCLESTON MOTORS CORPORATION, OF LAS VEGAS, NEVADA, A CORPORATION OF DELAWARE.

AIR-COOLING SYSTEM FOR ENGINES.

Application filed December 3, 1923. Serial No. 678,154.

This invention has to do with air cooling systems for engines and is particularly applicable to internal combustion engines which furnish motive power for vehicles.
Therefore, I have chosen to illustrate and describe the invention in connection with this particular type of engine, but do not wish to infer thereby that it is restricted to such limited application.
While air cooling systems are conceded to be superior to liquid cooling systems in certain respects, well known to those skilled in the art, engines cooled solely by radiation and convection have not come into general favor or use due to the absence of means for efficiently overcoming certain of the problems peculiar to this type of cooling system. Therefore it is the principal object of my invention to provide an air cooling system which not only has the general and well known features of advantage over water cooling systems, but is also highly efficient under all conditions of operation and effectively overcomes certain difficulties which heretofore have never been successfully solved as fas as I am aware.

In order to secure efficient motor operation, it is not only important to keep the engine from becoming too hot, but also to avoid lowering the temperature of the cylinders below a certain point. One of the chief difficulties encountered in air cooling has arisen from the absence of provision for the direction of an abundance of cooling air against the heated cylinders to maintain the temperature thereof below the danger point in any situation, and means for regulating the amount of air so directed, whereby the temperature of the cylinders may be maintained within the allowable range under all operating conditions.

In the usual air-cooling system, the fans for inducing or forcing air around the cylinder walls are driven direct from the engine crank shaft, so the velocity of the air currents set up by the fans varies directly with the engine speed. Since the rate of cooling is directly proportional to the speed of the air current directed against the cylinders, it is evident that the cooling varies directly with the engine speed. This particular relationship between engine speed and the cooling effect is not desirable in the presence of certain engines and atmospheric temperature conditions. Therefore, I have provided means for regulating the air blast independently of the engine and fan speed, so the cooling effect may be varied at the will of the operator to keep the temperature of the cylinders within the desirable range irrespective of changes in engine or atmospheric temperature conditions.

The major portion of the air utilized for cooling purposes is taken in through apertures provided in the forward walls of the engine hood, and during forward movement of an equipped vehicle, the inrush of air through these apertures varies with the speed of the vehicle. In this connection, I have provided means for positively directing the air from the hood apertures to the intake of the cooling system, this provision for air direction being of special utility where high vehicle speeds are attained, when, but for the directing means, the air tends to rush past, rather than into, the intake opening.

How I accomplish the above advantageous results will be understood from consideration of the following detailed description, wherein further objects and features of novelty of the invention will be set forth.

Reference will be had to the accompanying drawings, in which.

Figure 1:
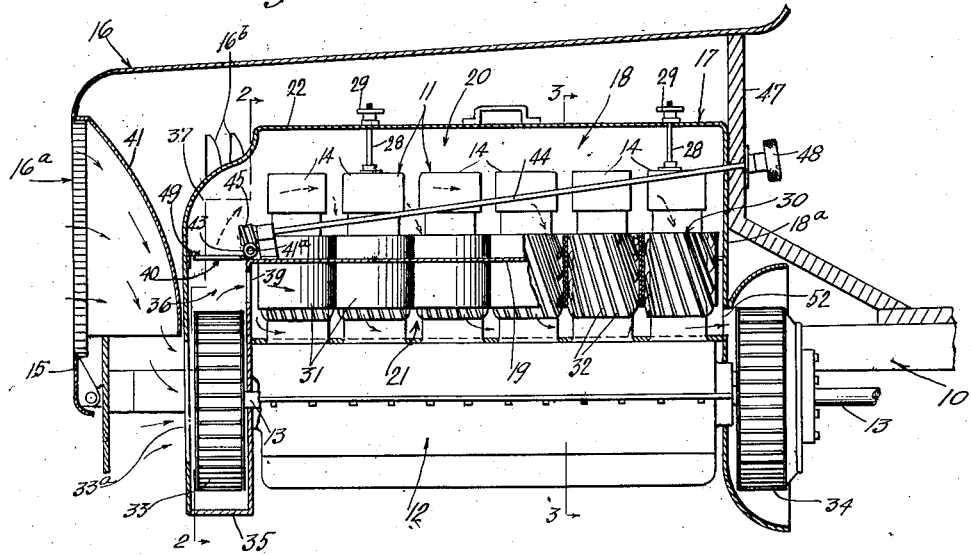
Figure 1 is a longitudinal section of a vehicle carried internal combustion engine to which my cooling system has been applied, the section being taken about on the irregular line 1—1 of Figure 2.

In the drawing, numeral 10 generally indicates a vehicle frame, upon which an engine 11 is mounted, the engine including a usual crank case 12, crank shaft 13, and cylinders 14. The forward wall 15 of engine hood 16 is provided with air passages or apertures 16ª whereby exterior air is freely admitted to the hood enclosed compartment.

Figure 3:
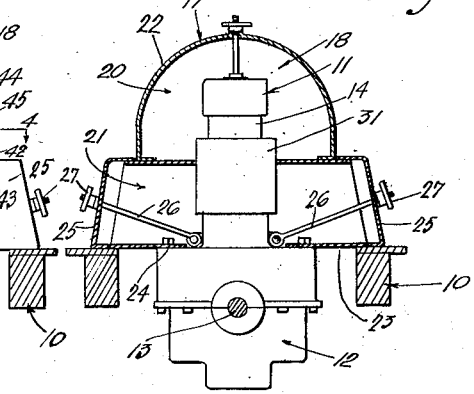
Fig. 3 is a section on line 3—3 of Figure 1.

A housing, generally indicated at 17, defines a chamber 18 about the upper extent of the engine, a substantially horizontal partition 19, through which cylinders 14 vertically extend, dividing the chamber into upper and lower compartments 20 and 21, respectively. In the preferred housing construction illustrated, a bonnet 22, forming the upper, end and side walls for compartments 20, rests on partition 19 which is spaced vertically above lower housing wall 23, the latter preferably being secured at 24 to the engine crank case. Side plates 25 for compartments 21 are supported in a manner clearly illustrated in Figure 3, being removably held in position by bolts 26 on engine 11, and retention nuts 27. In a similar manner, bonnet 22 is removably held in position by bolts 28, and retention nuts 29; the bonnet and side plates thus being made separable from the engine and the remainder of the housing in order that the engine and certain of the cooling system elements may be accessible for inspection and repair.

Passage ways 30 are provided through partitions 19 and around cylinders 14 to allow communication between upper and lower compartments. In the illustrated embodiment of the invention, these passageways, which provide air jackets for the cylinders, are defined by the walls of the cylinders and sleeves 31 which are spaced therefrom and extend from compartment to compartment through suitable apertures in the partition.

In most air cooled engines, series of longitudinally extending flanges 32 are provided along the engine cylinders to increase the effective radiating surface, and I have illustrated such flanges as serving also to space the sleeves from the cylinders. I prefer to spirally arrange these flanges (as clearly shown in Figure 1 where the sleeves are broken away) to increase the flange surface and to hasten the flow of air by giving it a swirling movement as it is forcibly passed through the flutes between flanges.

I have provided means in the form of blower fans 33 and exhausting fan 34 (each fan preferably of the centrifugal, multivane type with curved blades, and wherein air taken in at the center of the fan is delivered at the fan periphery to a surrounding casing) for directing a current of air through the air jackets about the cylinders and against the cylinder flanges to absorb and dispose of the heat generated within the cylinders. Fans 33 and 34 are arranged fore and aft of the engine and are preferably direct connected and driven by crank shaft 13. To secure maximum efficiency from the system, both fans are simultaneously operated, but by the separate use of either fan (in other words by the use of either a forced or induced draft) I am still able to provide a superior cooling system. Therefore I will separately describe the forced and induced draft creating sides of the system, whereupon the advantages of their combined use will be apparent.

In considering the forced draft system by itself, the lower housing wall 23 may be disregarded, it being assumed, for convenience, that the air jackets about the cylinders then open directly to the atmosphere.

Fan 33 is housed within casing 35, the throat 36 of which communicates with compartment 20 through duct 37. In one of the throat defining walls 38 is an aperture 39 opening below partition 19 and so located that it may be closed or opened by movement of valve blade 40, the action of which will be presently described. Opening 39 serves as a by-pass opening in certain situations, and as an air inlet for compartment 21 in other situations, while either duct 37 or throat 36 may be considered as the air inlet to chamber 18, considered as a whole, or to compartment 20.

Figure 2:
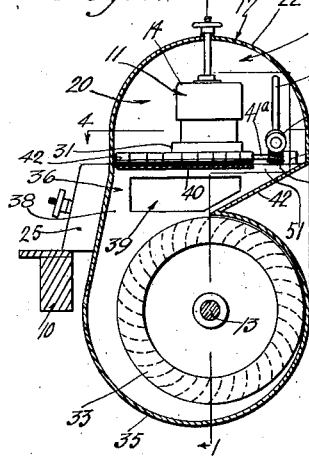
Fig. 2 is a section on line 2—2 of Figure 1.

As the speed of the vehicle increases, air admitted through apertures 16$^a$ normally has an increasing tendency to rush horizontally and directly through the hood, setting up a certain amount of back pressure or escaping through the hood louvers 16$^b$, should such be provided. At the air intake of the fan is necessarily quite low and out of horizontal alinement with respect to apertures 16$^a$, this tendency of the air would result, but for the provision of counteracting means, in the air rushing above and past the fan intake, with a corresponding decrease in the amount of air delivered to the cooling system. Thus the efficiency of the system would be lowered as the speed of the vehicle increased. Therefore, in order that at all times ample air may be positively delivered to fan 33 (or broadly, to the inlet of chamber 18) I have provided a director 41 extending from a point near or above the topmost apertures 16$^a$ in hood wall 15, said director sloping or curving downwardly and inwardly toward the fan intake opening 33$^a$. In order to more positively "pick up" air from the fan and direct such air from the fan casing through duct 37, throat defining wall 42 (Figure 2) inclines inwardly and downwardly from partition 19 so as to be substantially tangential to the fan periphery.

Valve blade 40 is carried on hinge pin 41$^a$ which has bearing at 42 along the forward edge of partition 19, and carries a worm gear 43. A valve control rod 44 carries worm 45 in mesh with gear 43, and has bearing at 46 on partition 19, from which point it extends to and through the rear housing wall 18$^a$ and dash or instrument board 47. Rod 44 terminates in a knob or hand grip 48 which is accessible to the vehicle operator and preferably within comfortable reach from the vehicle seat. It is obvious that by manually revolving rod 44 in one direction, blade 40 is swung downwardly from its position in Figures 1 and 2 to a vertical position in which it acts as a closure for opening 39; while by revolving the rod in the opposite direction, the blade is swung upwardly and back to the position illustrated, angle irons 49 serving as a stop to limit the clockwise movement of the blade as viewed in Figure 1. Thus, in effect, blade 40 may be considered as a two-way valve whereby air delivered by fan 33 may be diverted into either or both of said compartments.

Assume now that during a period of engine operation, blade is swung to such a position that it completely closes by-pass port 39, thereby leaving the passage between the fan casing and compartment 20 entirely uninterrupted. The full volume of air delivered by fan 33 then passes into the upper compartment, whence it passes downwardly and out through passageways 30 (see dotted arrows in Figure 1), partially absorbing the heat of the cylinder walls and flanges during such passage. It will be remembered during this discussion of the forced draft phase of the cooling system, lower housing wall 23 may be eliminated, so it may properly be assumed that the heated air passes from passageways 30 directly to the atmosphere, thus disposing of the heat which it has absorbed.

Now should the cooling effect be too great for efficient motor operation, rod 44 is manipulated to swing blade 40 away from wall 38 and towards the position of Figure 1 (the amount of blade movement depending upon the degree of change in cooling effect to be accomplished), whereupon a certain proportion of the air delivered by the fan is diverted from duct 37 and passes through port 39 to the atmosphere. By thus reducing the volume of air forced through compartments 20 and passageways 30 to a proper amount, the cooling effect on the engine is reduced to the desired degree.

Figure 4:
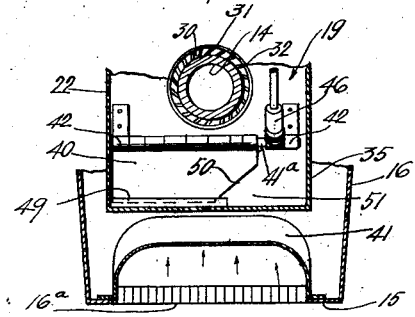
Fig. 4 is a plan section on line 4—4 of Figure 2.

I have beveled off the end of blade 40 at 50 (Figure 4) so when said blade is swung to the position of Figure 1 there is still a restricted passageway 51 allowing the passage of air from fan 33 to the upper compartment, although the major portion of fan delivered air passes through bypass port 39 and has no cooling effect on the cylinders. By reason of this, a safe guard is provided whereby the flow of cooling air around the cylinders may never be entirely checked during operation of the motor, the need for such precaution being obvious.

It will be noted that the air delivered by the fan is not "choked down" when it is desired to reduce the cooling effect, but rather, the superfluous air is merely diverted from one course to another. Thus no back pressure is created to impede the fan movement or impair the efficiency of the fan driving means.

At this point, I wish to make mention of the fact that while I have illustrated a manual control for shifting blade 40, it lies within the scope of my broader claims to use thermostatically actuated means for controlling the blade movement, whereby temperature changes in chamber 18, in the cylinder walls, or in the atmosphere may effect corresponding blade movement and diversion of the air current set up by the fan.

Now considering exhauster fan 34 (and disregarding blower 33, for the present) housing wall 18ᵃ is apertured at 52 to provide an outlet opening in register with the intake of said exhauster. With the motor in operation, and with blade 40 in position to completely close port 39, which may now be considered an inlet opening for compartment 21, fan 34 induces a flow of air through casing throat 36, duct 37, compartment 20, passageways 30 (where it absorbs heat from the cylinder walls and flanges), compartment 21 and outlet 52, the heated air being then delivered by the fan to the atmosphere, either directly or through a suitable duct (not shown) leading to a point of exhaust.

By swinging blade 40 in a manner to open port 39, the exhauster fan induces a flow of air through the path of least resistance, namely, directly from fan casing 35, with a consequent reduction in the amount of air induced to flow through passageways 30. In such a situation, compartment 21 acts as an induced air by-pass around upper compartment 20, although, even with blade 40 in the position of Figure 1, a certain amount of air may still be drawn through restricted opening 51, compartment 20 and passageways 30 to insure a certain amount of cooling draft at all times. Thus the cooling effect on the cylinder walls and flanges may be reduced without reducing fan speed or in any way impairing the efficiency of the fan or fan driving means.

Having pointed out separately the means for forcing and inducing an air current around the cylinders, and having described the flow regulating means common to both, it is obvious that in a combination of the two, the efficiency of the cooling system, considered as a whole, is greatly increased, and that at all engine speeds and conditions of temperature, the two fans combine in their action to positively insure a cooling draft ample for the occasion. The air expands during its passage around the heated cylinder walls, and to compensate for the volume expansion, the exhauster fan 34 is preferably designed or driven to pass a greater volume of air per unit time than does the blower.

I wish to make the reservation that while the drawings and description are illustrative of a single embodiment of the invention, they are not to be considered as restrictive on the broader claims appended hereto, for certain changes in design, structure and arrangement may be made without departing from the spirit and scope of such claims.

I claim:

1. A cooling system for engines, including a housing through one wall of which the engine cylinders extend, the housing defining an air compartment about the upper extent of the cylinders, there being outlet openings provided through said wall around the cylinders, a blower for delivering air to, and passing it through the compartment and out the outlet openings and valve means in the housing for by-passing the flow of air from the blower around the compartment and to the exterior of the housing.

2. A cooling system for engines, including a housing through one wall of which the engine cylinders extend, the housing defining an air compartment about the upper extent of the cylinders, there being passageways provided through said wall around the cylinders; a fan casing and a fan therein, the fan casing and compartment being in communication, means for driving the fan to deliver air from the casing to the compartment, and a valve between the fan and compartment, said valve, being operable to by-pass air from the casing around the compartment to the exterior of the housing.

3. A cooling system for engines, including a housing through one wall of which the engine cylinders extend, the housing defining an air compartment about the upper extent of the cylinders, there being passageways provided through said wall around the cylinders; a fan casing and a fan therein, the fan casing and compartment being in communication, the fan casing being provided with a by-pass opening, means for driving the fan, a valve between the fan and compartment and associated with the by-pass opening, and means for operating the valve in a manner to regulate the relative proportion of air delivered by the fan to the compartment and through the by-pass opening.

4. A cooling system for engines, including a housing through one wall of which the engine cylinders extend, the housing defining an air compartment about the upper extent of the cylinders, there being passageways provided through said wall around the cylinders; a fan casing and a fan therein, the delivery throat of the fan casing being in communication with the compartment, and a by-pass opening being provided in the throat; a two-way valve in the throat and associated with the by-pass opening, and means for actuating the valve to regulate the proportionate amount of air delivered by the fan to the compartment and through the by-pass opening.

5. In a cooling system for an engine mounted beneath a vehicle supported hood having its forward walls apertured substantially throughout its extent to allow the inrush of air to the interior of the hood during forward movement of the vehicle; a housing which defines an air chamber about the engine and which is provided with air inlet and outlet openings, a fan disposed out of direct alinement with certain of the wall apertures, means for driving the fan to deliver air to the chamber through the inlet thereof; and a director member associated with the apertured hood walls and the fan in a manner to direct air from said certain apertures to the fan intake.

6. A cooling system for engines, embodying a housing which defines an air chamber about the engine, a partition dividing the chamber into a plurality of compartments, there being compartment connecting passageways through the partition, there also being provided air inlets for each of the compartments and an outlet to the atmosphere from one of the compartments, fan means for introducing exterior air through one or more of the inlets and passing it through the chamber and outlet, a valve at the inlets and adapted to regulate the proportionate volume of this air allowed to pass through the individual inlets.

7. A cooling sytem for engines, embodying a housing which defines an air chamber about the engine, a partition dividing the chamber into a plurality of compartments, there being compartment connecting passageways through the partition, there also being provided air inlets for each of the compartments and an outlet to the atmosphere from one of the compartments, valve means for the inlets, a blower for delivering air to the chamber through the inlets, an exhauster fan for drawing the air from the chamber through the outlet, said valve means being adapted to regulate the proportionate volume of this air allowed to pass through the individual inlets.

8. A cooling system for engines, embodying a housing which defines an air chamber about the engine, a substantially horizontal partition dividing the chamber into upper and lower compartments, there being compartment connecting passageways through the partition, a fan casing and a fan in the casing, means for driving the fan, the delivery throat of the fan casing being in communication with the upper compartment and one of the throat walls being provided with an aperture opening into the lower compartment, unitary valve means for varying the effective throat opening to the upper compartment and for varying the effective size of the aperture; an exhauster fan associated with the lower compartment, and means for driving the exhauster fan to draw air from said lower compartment.

9. A cooling system for engines, embodying a housing which defines an air chamber about the engine, a substantially horizontal partition dividing the chamber into upper and lower compartments, there being compartment connecting passageways through the partition, a fan casing and a fan in the casing, means for driving the fan, the delivery throat of the fan casing being in communication with the upper compartment and one of the throat walls being provided with an aperture opening into the lower compartment, the lower compartment having an outlet opening a movable closure for the aperture, and means for moving the closure to open the aperture and simultaneously reduce the effective throat opening to the upper compartment, whereby air delivered by said fan is diverted through the lower compartment and passed through the outlet to the atmosphere.

10. A cooling system for engines, embodying a housing which defines an air chamber about the engine, a substantially horizontal partition dividing the chamber into upper and lower compartments, there being compartment connecting passageways through the partition around the engine cylinders, there being air inlet openings for the upper and lower compartments and an air outlet opening for the lower compartment, an exhauster fan operatively associated with the outlet of the lower compartment to withdraw air therefrom, means for driving the exhauster fan; and means for simultaneously and reversely varying the effective openings of the compartment inlets.

In witness that I claim the foregoing I have hereunto subscribed my name this 17th day of November, 1923.

OSCAR FREDERICK LUNDELIUS.